(12) United States Patent
Lloyd

(10) Patent No.: US 8,725,849 B1
(45) Date of Patent: May 13, 2014

(54) BROWSER CACHE PRE-POPULATION

(75) Inventor: Matthew Lloyd, Cambridge, MA (US)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 13/232,121

(22) Filed: Sep. 14, 2011

Related U.S. Application Data

(60) Provisional application No. 61/473,895, filed on Apr. 11, 2011.

(51) Int. Cl.
*G06F 15/177* (2006.01)

(52) U.S. Cl.
USPC .......................................... 709/220; 709/227

(58) Field of Classification Search
None
See application file for complete search history.

(56) References Cited

U.S. PATENT DOCUMENTS

| | | | |
|---|---|---|---|
| 6,182,133 B1* | 1/2001 | Horvitz | 709/223 |
| 7,047,485 B1* | 5/2006 | Klein et al. | 715/205 |
| 2003/0004995 A1* | 1/2003 | Novaes | 707/513 |
| 2009/0234947 A1* | 9/2009 | Decasper et al. | 709/224 |
| 2010/0161831 A1* | 6/2010 | Haas et al. | 709/235 |
| 2011/0040718 A1* | 2/2011 | Tendjoukian et al. | 706/52 |
| 2011/0238921 A1* | 9/2011 | Allen et al. | 711/137 |
| 2012/0246257 A1* | 9/2012 | Brown | 709/213 |

* cited by examiner

*Primary Examiner* — Ario Etienne
*Assistant Examiner* — Clayton R Williams
(74) *Attorney, Agent, or Firm* — Harrity & Harrity, LLP

(57) ABSTRACT

A device may generate, based on historical access pattern information of web content items, a set of web content items that are likely to be accessed by a first user of a client device through a browser program. The device may transmit the determined set of web content items to the client device for pre-population of the cache of the browser program.

26 Claims, 9 Drawing Sheets

BROWSER CACHE PRE-POPULATION

RELATED APPLICATION

This application claims priority under 35 U.S.C. §119 based on U.S. Provisional Patent Application No. 61/473,895, filed Apr. 11, 2011, the disclosure of which is incorporated by reference herein in its entirety.

BACKGROUND

Many techniques are available to users today to find information on the world wide web ("web"). For example, users often use web browsers and/or search engines to find information of interest.

Browsers interact with websites by submitting a request for content to the website. In response, the website transmits the content to the browser. Many browsers include the ability to cache content, in which content previously received from a website is stored by the browser. When the user requests content that was previously requested and stored in the cache, the browser may retrieve the cached content instead of retrieving the content from the website. Caching can be advantageous in reducing network load and increasing the perceived performance of the browser.

SUMMARY

According to an implementation, a method may include receiving access pattern information relating to web content items and user-specific information of users that access the web content items. The method may further include receiving a request for content items to use in pre-population of a cache of a browser of a client device of a particular user; and determining, based on user-specific information of the particular user and the access pattern information relating to the web content items, one or more of the web content items to transmit to the particular user. The method may further include transmitting the determined one or more of the web content items to the cache of the browser of the client device.

According to another implementation, a computer-readable medium may include one or more instructions to receive access pattern information relating to web content items and user-specific information of users that access the web content items; one or more instructions to receive a request for content items to use in pre-population of a cache of a browser associated with a particular user; one or more instructions to determine, based on user-specific information of the particular user and the access pattern information relating to the web content items, one or more of the web content items to transmit to the particular user; and one or more instructions to transmit the determined one or more of the web content items to the cache of the client.

In another implementation, a server device may include one or more processors; and a memory to store instructions executable by the one or more processors to: generate, based on historical access pattern information obtained from users and for web content items, a set of web content items that are likely to be accessed by a particular user of a client device through a browser program, where the set of web content items are a subset of the web content items; and transmit the set of web content items to the client device to pre-populate a cache of the browser program.

In another implementation, a computer-readable medium may include one or more instructions to generate, based on historical access pattern information obtained from users and for a plurality of web content items, a set of web content items that are determined to be relatively likely to be accessed by a first user of a client device through a browser program, where the set of web content items are a subset of the web content items; and one or more instructions to transmit the set of web content items to the client device for inclusion in a cache of the browser program.

In yet another implementation, a device may include means for receiving access pattern information relating to web content items and user-specific information of users that access the web content items; means for receiving a request for content items to use in pre-population of a cache of a browser of a client device associated with a particular user; means for determining a list of web content items, based on a rate of access of the web content items, by analyzing the access pattern information; means for fetching and storing content corresponding to the list of web content items, where hyper-text transfer protocol (HTTP) header information is stored with the stored content items; means for determining, based on user-specific information of the particular user and the determined rate of access of the web content items, one or more of the web content items, from the list of web content items, to transmit to the client device; and means for transmitting the determined one or more of the web content items, including the HTTP header information, to the cache of the browser of the client device.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

Web traffic tends to follow a long-tail distribution in which the top few hundred websites may account for the majority of non-video web traffic. Much of the content of websites changes slowly over time. For example, company logos, cascading style sheets (CSS), and JavaScript files may be website data that is updated relatively infrequently. Consistent with aspects described herein, a browser's cache may be pre-populated or supplemented with cache data delivered to the browser outside of normal use of the browser (i.e., outside of web browsing activity). The pre-populated or supplemental cache data may be determined based on information relating to the user of the browser.

Figure 1:
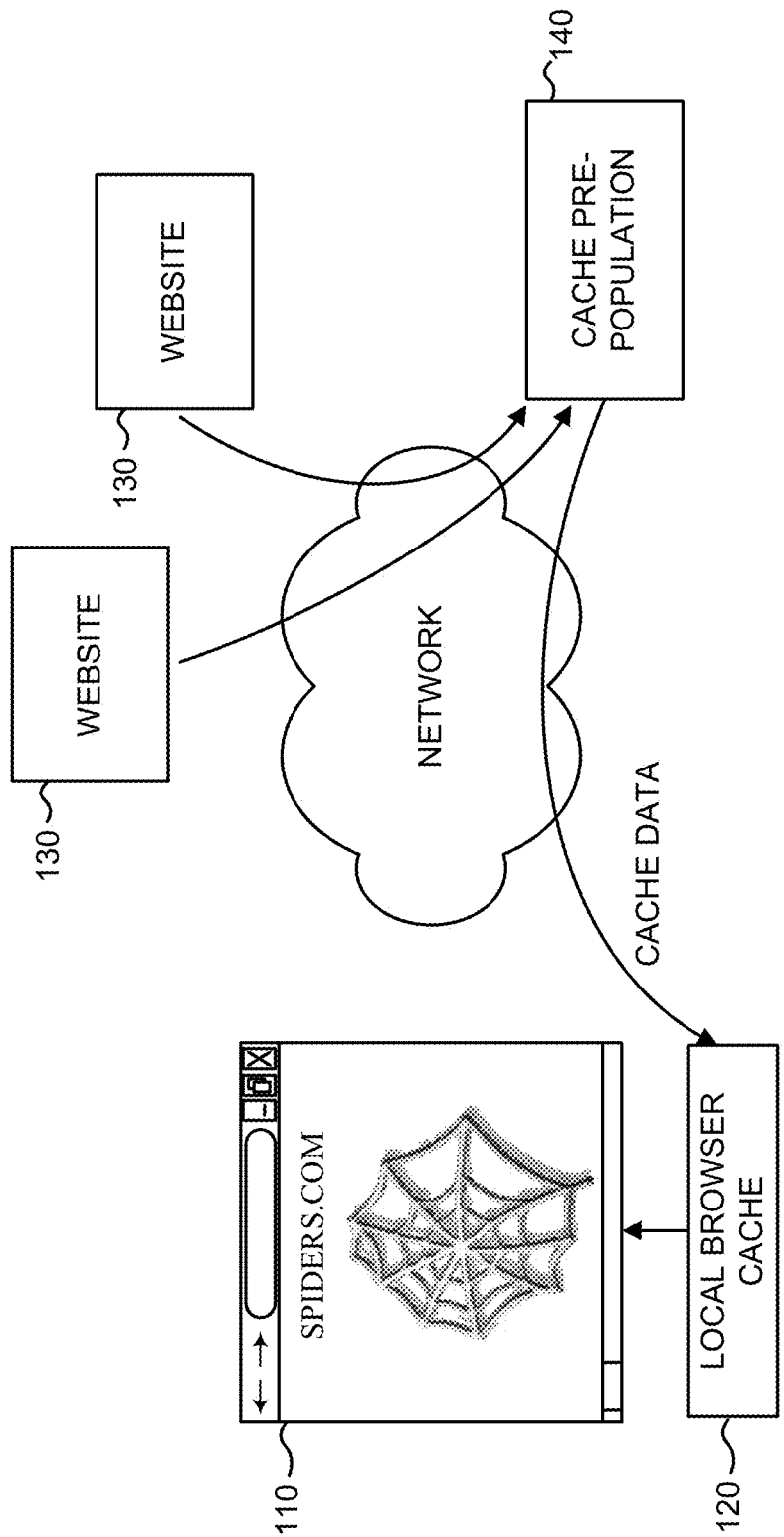
FIG. 1 is a diagram illustrating an overview of an example implementation described herein.

FIG. 1 is a diagram illustrating an overview of an example implementation described herein. Assume that a user uses a web browser 110, which includes a local browser cache 120, to access websites, such as websites 130. In FIG. 1, the example website "spiders.com" is shown being displayed by browser 110.

Cache pre-population component 140 may access websites 130 to obtain cacheable browser content. Cache pre-population component 140 may also maintain other information relating to websites 130, such as information relating to the popularity of websites 130 and/or information relating to users that tend to access websites 130. Cache pre-population component 140 may also receive information relating to a user of web browser 110, such as information that can be used to know or infer which websites the user is likely to visit. For example, with the user's express permission, the user's location, demographic information, or other information relating to the user's browsing tendencies, may be used by cache pre-population component 140 to determine websites that the user is likely to visit. Based on the website popularity information and/or the user-specific information, cache pre-population component 140 may select cacheable content items from one or more websites 130 and transmit the content items to local browser cache 120. Advantageously, by pre-populating the cache with web content that is likely to be requested, the browser's cache hit rate may be immediately increased, which may reduce page load times and, thus, provide for an enhanced web browsing experience.

Example Environment

Figure 2:
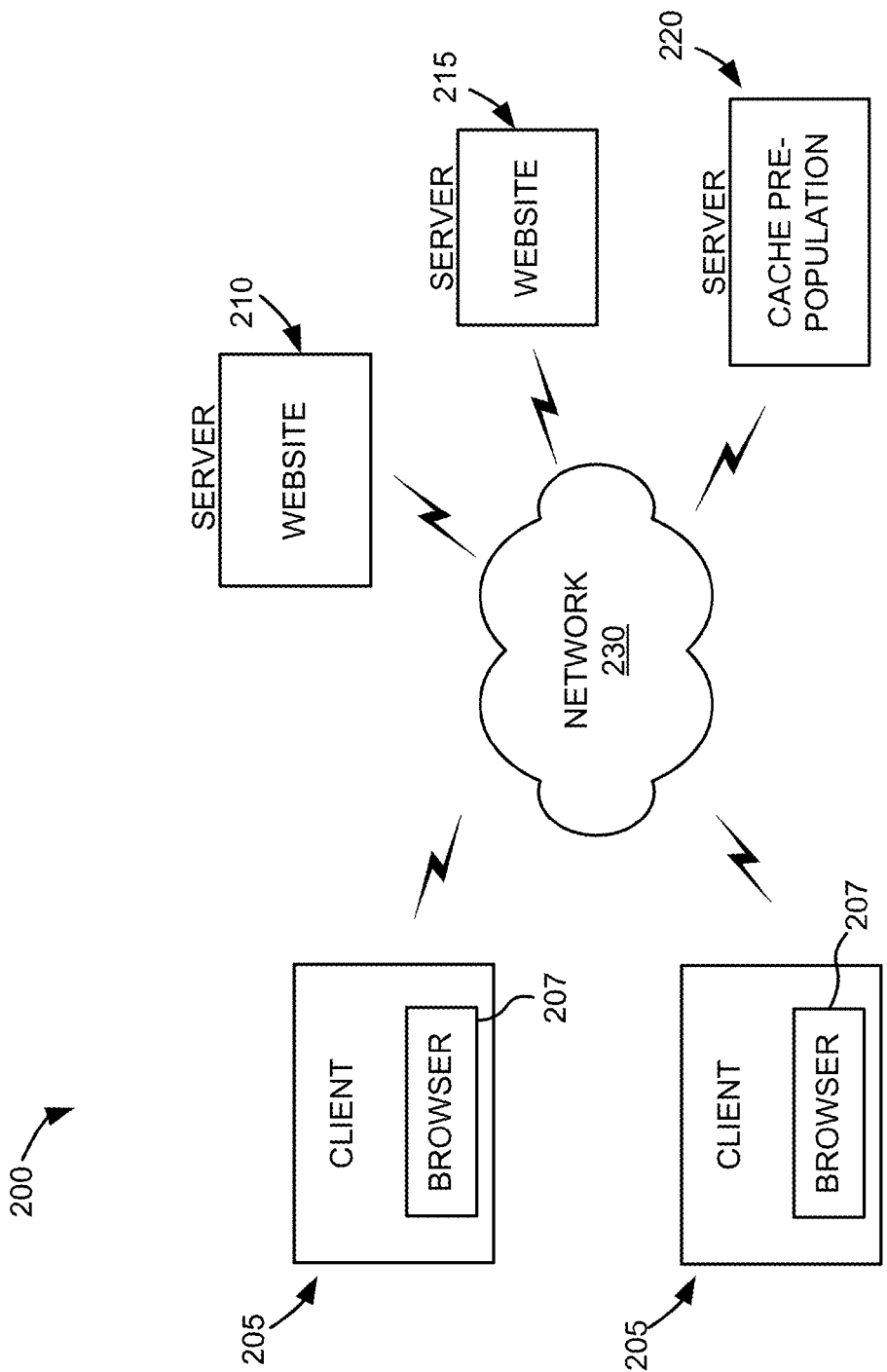
FIG. 2 is a diagram of an example environment in which systems and/or methods described herein may be implemented.

FIG. 2 is a diagram of an example environment 200 in which systems and/or methods described herein may be implemented. Environment 200 may include multiple clients 205 connected to multiple servers 210-220 via a network 230. Two clients 205 and three servers 210, 215, and 220 have been illustrated as connected to network 230 for simplicity. In practice, there may be more or fewer clients and servers. Also, in some instances, a client may perform a function of a server, and a server may perform a function of a client.

Clients 205 may include devices, such as personal computers, wireless telephones, personal digital assistants (PDAs), lap tops, or another type of computation or communication device. Clients 205 may include user interfaces, presented through browsers 207. Through browser 207, a user may access web content provided by servers 210 and 215.

Servers 210, 215, and 220 may include server devices that gather, process, search, and/or implement services in a manner described herein. In one implementation, servers 210 and 215 may be servers that host websites. Servers 210 and 215 may respond to requests, such as hyper-text transfer protocol (HTTP) requests, from clients 205 for content items, such as HTML pages, JavaScript files, CSS files, images, or other content items, stored by server 210/215. Server 220, which will also be called cache pre-population server 220 herein, may include a server device to transmit cacheable content items from servers 210/215 to clients 205 for pre-population of the browser cache at clients 205. The operation of cache pre-population server 220 will be described in more detail below.

Additional servers, implementing services other than a website or cache pre-population, although not explicitly shown, may also be implemented in environment 200. The additional servers may implement, for example, payment services, shopping services, social networking services, etc.

While servers 210 through 220 are shown as separate components, it may be possible for one or more of servers 210-220 to perform one or more of the functions of another one or more of servers 210-220. For example, it may be possible that two or more of servers 210-220 are implemented as a single server. It may also be possible for a single one of servers 210-220 to be implemented as two or more separate (and possibly distributed) servers.

Network 230 may include any type of network, such as a local area network (LAN), a wide area network (WAN), a telephone network (e.g., the Public Switched Telephone Network (PSTN) or a cellular network), an intranet, the Internet, or a combination of networks. Clients 205 and servers 210-220 may connect to network 230 via wired and/or wireless connections.

Example Components of Client and/or Server

Figure 3:
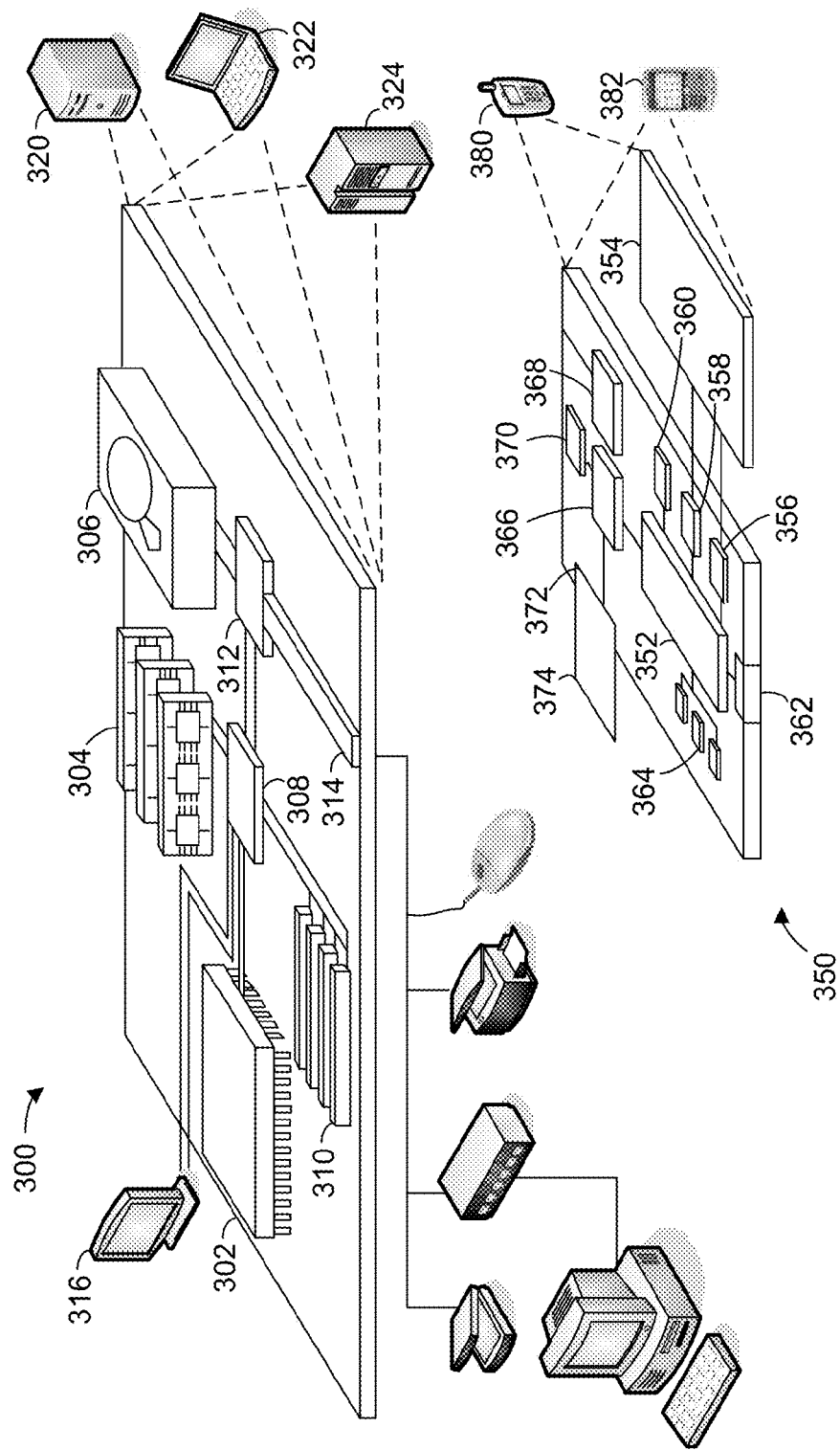
FIG. 3 shows an example of a generic computer device and a generic mobile computer device.

FIG. 3 shows an example of a generic computing device 300 and a generic mobile computing device 350, which may be used with the techniques described here. Generic computing device 300 and generic mobile computing device 350 may correspond to, for example, a client 205 and/or a server 210, 215, or 220. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations of the inventions described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface (GUI) on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system, etc.).

Memory 304 stores information within the computing device 300. In one implementation, memory 304 includes a volatile memory unit or units. In another implementation, memory 304 includes a non-volatile memory unit or units.

The memory 304 may also be another form of computer-readable medium, such as a magnetic or optical disk.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In one implementation, high-speed controller 308 is coupled to memory 304, display 316 (e.g., through a graphics processor or accelerator), and to high-speed expansion ports 310, which may accept various expansion cards (not shown). In this implementation, low-speed controller 312 is coupled to storage device 306 and low-speed expansion port 314. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output (I/O) device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Browser Cache Operation

Figure 4:
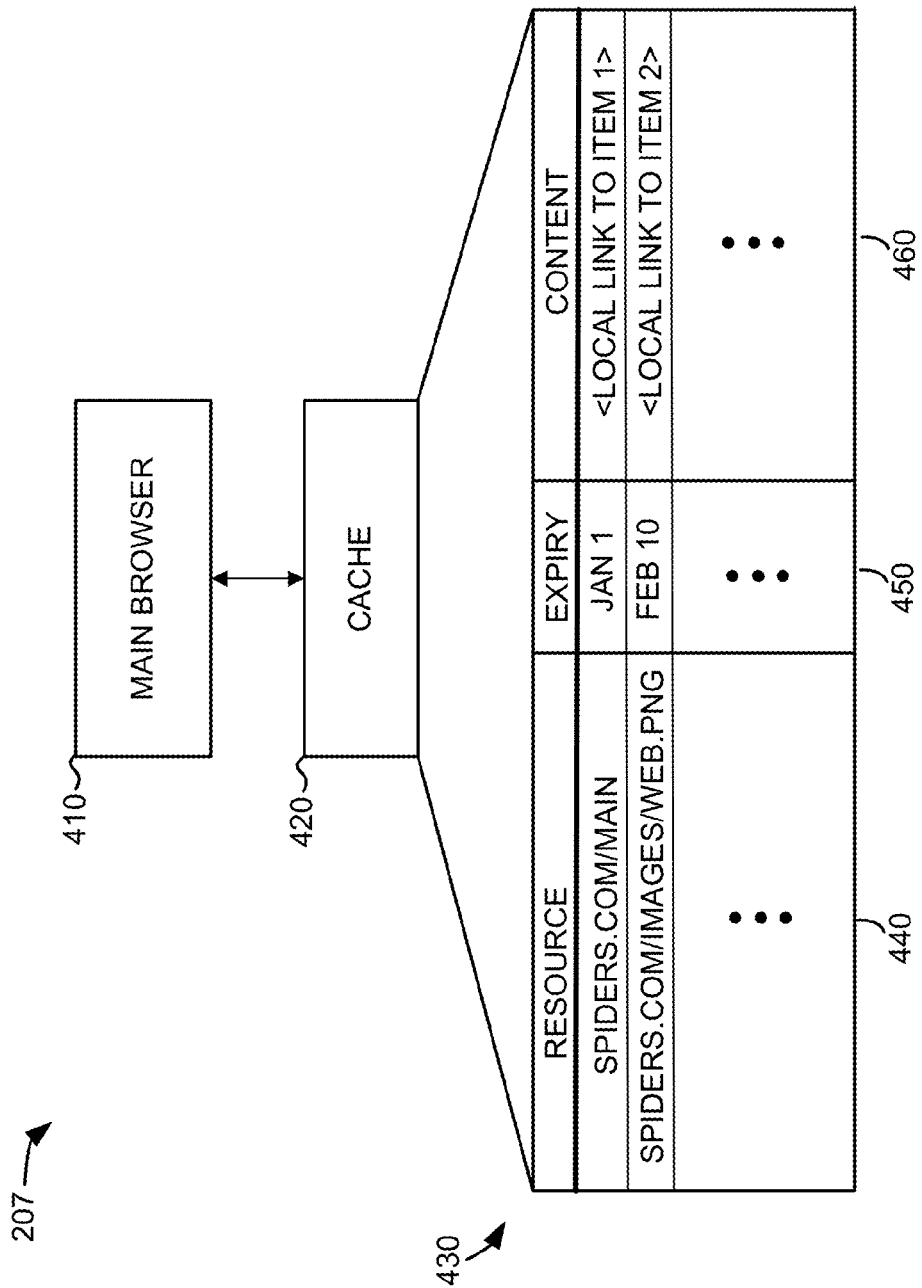
FIG. 4 is a diagram illustrating an example of components of a browser.

FIG. 4 is a diagram illustrating an example of components of browser 207. Browser 207 may include a main browser portion 410 and a cache portion (cache) 420. Main browser portion 410 may generally operate to fetch content items, such as web pages specified by uniform resource locators (URLs), and render the content items to present the content to the user.

When fetching content items over network 230 (i.e., from an external web server 210 or 215), main browser portion 410 may first check whether the requested content is in cache 420. If so, main browser portion 410 may retrieve the content from cache 420 instead of from the resource located over network 230. If the requested content is not located in cache 420, the content may be retrieved as normal over network 230. If the content is cacheable, the content may additionally be stored in cache portion 420 so that the next time that the content is requested, it may be retrieved from cache portion 420. Whether a particular content item is cacheable, and other information relating to the cacheability of the content items, such as the expiration date of a cacheable content item, may be included in header information, such as HTTP header information, of a response from a server 210/215.

Cache 420 may include a solid state (e.g., disk drive) or volatile memory (e.g., random access memory) cache. Cache 420 may be implemented as a database, file structure, or other data structure to store content items that may be requested by a user of browser 207. One example of an implementation of cache 420 is illustrated in FIG. 4 as table 430. Table 430 may include a resource identification field 440, an expiration (EXPIRY) field 450, and a content field 460. Resource identification field 440 may store an identification for the content item. Resource identification field 440 may include, for example, a URL or other resource identifier. A number of example entries are shown in table 430 for resource identification field 440, including the URLs "spider.com/main" and "spider.com/image/web.png." Expiry field 450 may include information identifying when a particular cache entry is to expire. Website creators may designate that certain content items are cacheable but only for a certain period or until a certain date. After that period or date, browsers should discard the content item and retrieve the content item from the website. Content field 460 may include the corresponding content item or a local link to the content item (e.g., a link to a location of the content item in a memory). In one implementation, content field 460 may store, in addition to the content item itself (e.g., an HTML file, an image, a JavaScript file, etc.), any corresponding HTTP response headers that were received from servers 215/220.

Cache Pre-Population Server

Figure 5:
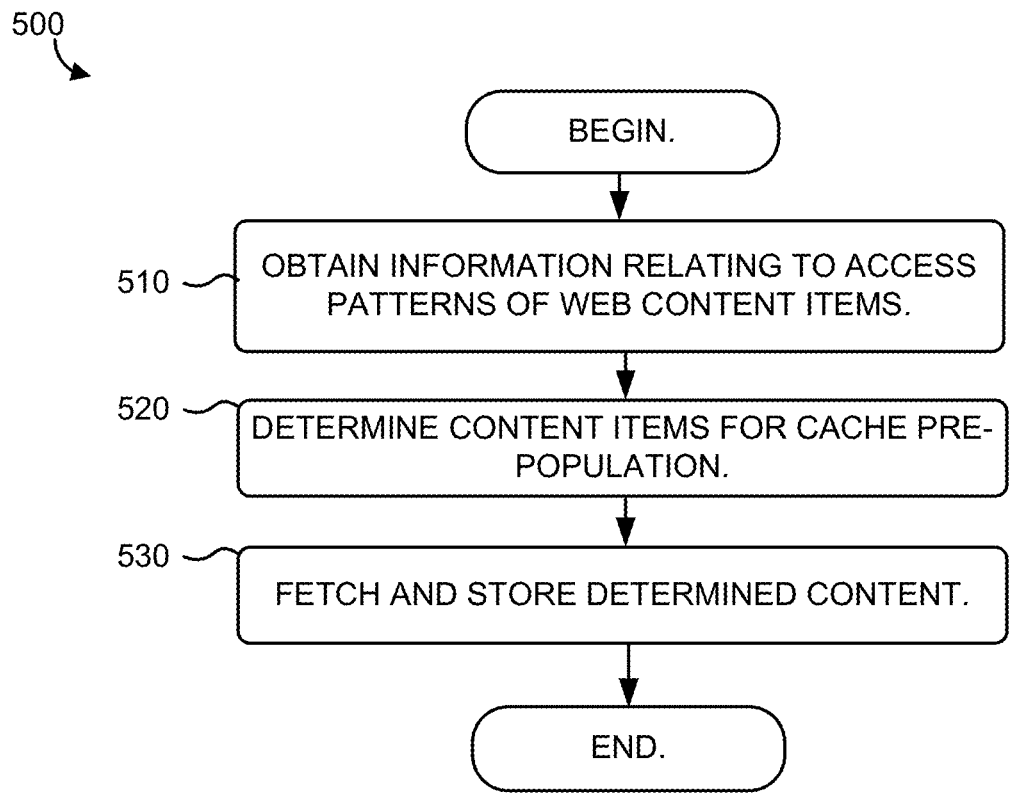
FIG. 5 is a flowchart of an example process for obtaining content items for use in pre-populating a browser's cache.

FIG. 5 is a flowchart of an example process 500 for obtaining content items for use in pre-populating a browser's cache. In one implementation, process 500 may be performed by one or more components of cache pre-population server 140. In another implementation, process 500 may be performed by a device or a combination of devices separate from or in combination with pre-population server 140.

Process 500 may include obtaining information relating to access patterns of website content items (block 510). The access pattern information may relate to a rate of access of cacheable web content items. The content items may include any cacheable resource that a user might request from servers 210/215. For example, a single web page may be associated with multiple different content items (e.g., different images, JavaScript files, etc.). The access pattern information may include, for example, a quantity of times that web content items were accessed and information relating to users that accessed the web content items. The access pattern information may include historical (i.e., observed) information that can be obtained in a number of ways. For example, browser toolbars may be used to collect information relating to the rate of access of various websites/resources. User link selections as logged by certain sites, such as search traffic at a search site, may also be used to obtain access pattern information. For example, user search result selections may be used to derive website access patterns. Other sources of web content access pattern information, such as data provided by other programs or by third parties, may also or alternatively be used. The access pattern information may be obtained from users that provide express consent.

The access pattern information may include user-specific information. The user-specific information may be information that can be used to relate a user to the likelihood that the user will access a particular web content item. For example, for each access of a web content item, one or more user "signals" may be obtained. In general, the user-specific signals may be signals that can be used to infer or predict whether the user will access a particular content item. One example, of the user-specific signals, includes the user's geographic location (e.g., country and/or city). A user's location may be useful because certain web content items are more relevant to particular geographic regions. For example, users in a specific city, such as Seattle, may be more likely to access a website that includes news from the Seattle area. Another example of user-specific signals may include user demographic information, such as the user's age, gender, employment status, etc. Another example of a user-specific signal is the type of operating system (OS) or browser of the user's client 205. The OS and browser type may be obtained from, for example, information received in HTTP headers. Still other types of user-specific information may include the user's IP address, the type of the user's network connection, and/or the ISP (Internet Service Provider) with which the user uses to connect to network 230. Other user-specific signals could also be used.

Figure 6:
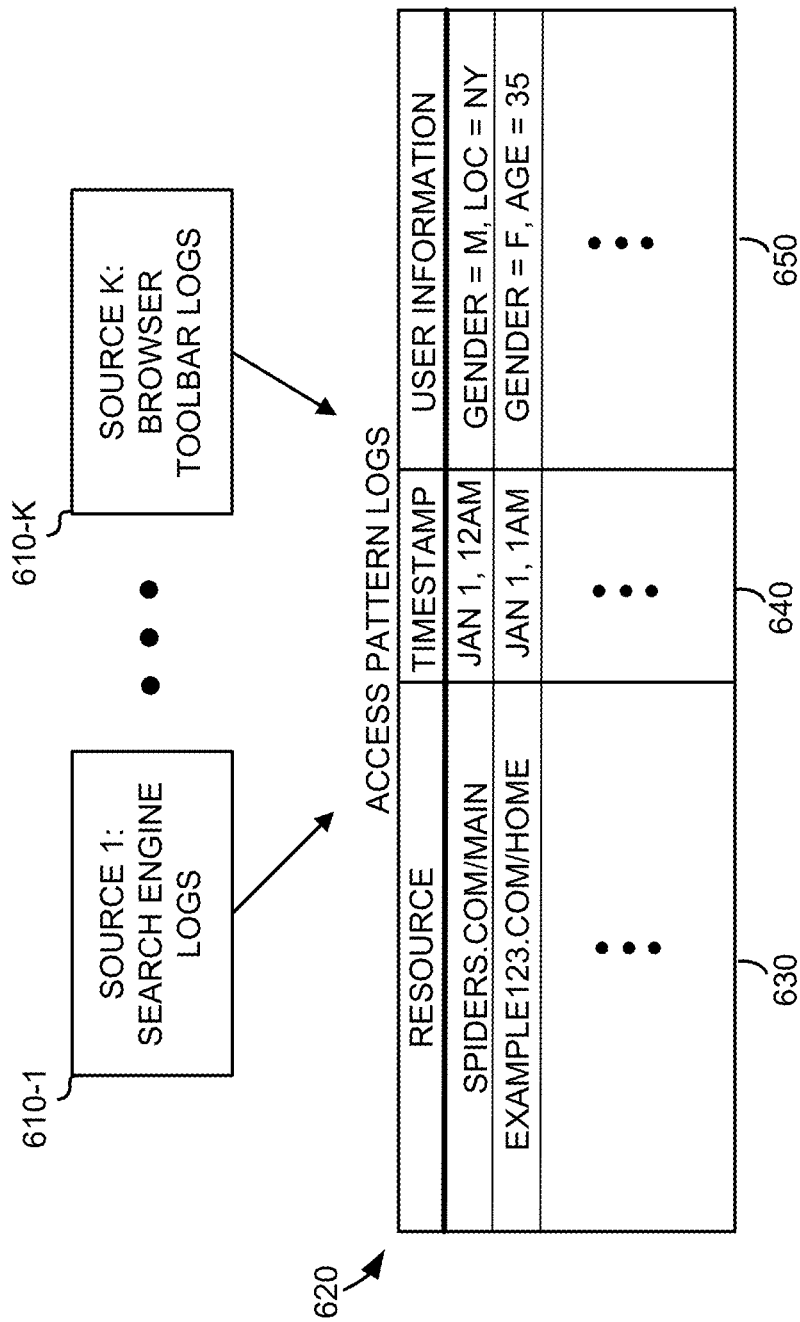
FIG. 6 is a diagram conceptually illustrating an example of access pattern information for web content items.

FIG. 6 is a diagram conceptually illustrating an example of access pattern information for web content items. As shown, a number of access pattern information sources, labeled as access pattern information sources 610-1 through 610-K (where K>=1), may provide access pattern information to access pattern logs 620. Access pattern logs 620 may represent, for instance, a database, file, or other structure that is stored by or is accessible by cache pre-population server 140.

Access pattern information sources 610 may include any source from which accesses of web content can be determined. As previously mentioned, the accesses to the web content may be associated with user-specific information (user signals) describing the user accessing the web content. Two example sources 610 are shown in FIG. 6: search engine logs 610-1 and browser toolbar logs 610-K. Search engine logs 610-1 may represent logs, maintained by a search engine, that describe which links (to web content items) are selected by users that use the search engine. Browser toolbar logs 610-K may represent logs, maintained by a toolbar installed in user browsers that describe which links (to web content items), are selected by users that use the browser. The user-specific information may be obtained with the express permission of the user.

Access pattern logs 620 may represent an aggregation of the access pattern information received from access pattern information sources 610. Each entry in access pattern logs 620 may represent the request of a cacheable web content item by a user. Access pattern logs 620 is illustrated, in FIG. 6, as a table including the fields: resource identification field 630, timestamp field 640, and user information field 650. Resource identification field 630 may store an identification for the content item that was accessed. Resource identification field 630 may include, for example, a URL or other resource identifier. Timestamp field 640 may include time/date information for each entry in access pattern logs 620. User information field 650 may include available user-specific information about the user that accessed the resource for the entry. In the example illustrated, user information field 650 is stored as textual key-value pairs. For example, the first entry in access pattern logs 620, for the content item "spiders.com/main," user information field 650 indicates that the user, that accessed the content item, was a male (GENDER=M) and was associated with the geographic location of New York City (LOC=NY). For the second entry in access pattern logs 620, for the content item "example123.com/home" user information field 650 indicates that the user, that accessed the content item, was a female (GENDER=F) and is 35 years old (AGE=35). In other implementations, access pattern logs 620 may include additional, fewer, or different fields than those illustrated in FIG. 6.

Referring back to FIG. 5, content items that will be used for cache pre-population may be determined (block 520). The content items may be determined based on web content access pattern information, such as that stored in access pattern logs 620. In general, the determined content items may be content that cache pre-population server 220 determines is likely to be accessed by users. A number of techniques could be used to determine content items that are likely to be accessed by users.

Figure 7:
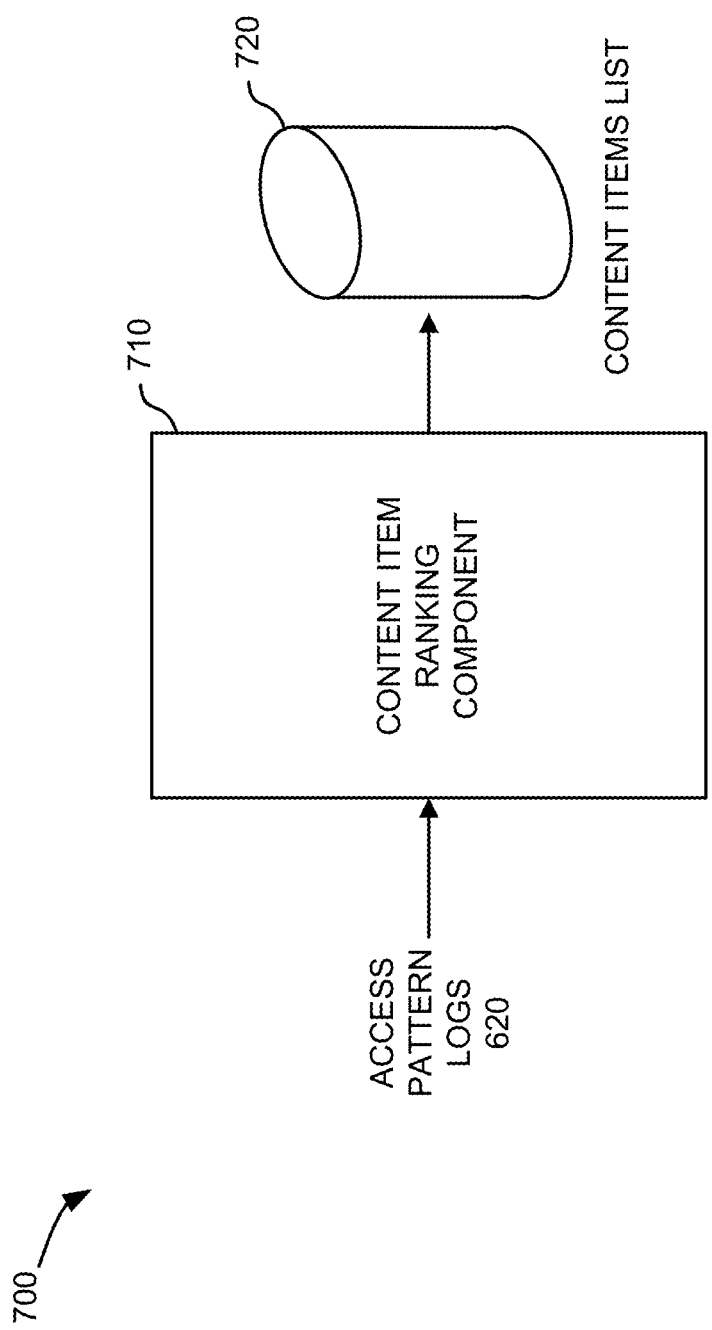
FIG. 7 is diagram conceptually illustrating components for one example implementation for determining content items for cache pre-population.

FIG. 7 is diagram conceptually illustrating functional components 700 for one example implementation for determining content items for cache pre-population, as performed in block 520. The components shown in FIG. 7 may be implemented by software and/or hardware of cache pre-population server 220.

Components 700 may include content item ranking component 710 and content items list 720. Content item ranking component 710 may receive the content item access patterns from access pattern logs 620 and generate content items list 720. Content items list 720 may represent the set of content items that cache pre-population server 220 may fetch and store from external servers (e.g., servers 210 and 215). In one implementation, the content items in content items list 720 may be a relatively large set of cacheable content items that are likely to be relevant to many different users. For example, each content item in access pattern logs 620 may be ranked on the relative frequency (rate) with which the content item is requested by all of the users represented in access pattern logs 620. The top 10,000 (or another number) of these content items may be included in content items list 720. In another possible implementation, the user base represented by access pattern logs 620 may be segmented in which combinations of the user-specific signals may be used to generate multiple user categories (e.g., "Windows OS users in NY City," "males aged 30-35 on the US West Coast," etc.). For each category, the most frequently accessed M (where M is an integer) number of content items may be included in content items list 720. In this case, content items list 720 may include the content items corresponding to all of the categories. Additionally or alternatively, other techniques could be used to determine content items to fetch and store by cache pre-population server 220.

The access rates for the content items may be calculated directly from access pattern logs 620 or the rates can be inferred from the total number of accesses for each web content item, web page, or website, and the sub-resources referred to by those content items, web pages, or websites. As an example of directly measuring the rate of access for a content item, content item ranking component 710 may determine, on a per-content item basis, the number of instances of a content item in access pattern logs 620 and divide that number by the time period covered by the access pattern logs 620 to obtain an observed rate of historical access. In some implementations, the size of the content items may additionally be taken into consideration. For instance, content item ranking component 710 may rank the content items using a score calculated as the rate of access of the content item divided by the size of the content item. A particular quantity of the highest ranking content items may then be assigned to content item list 720. Taking the size of the content items into account may make more efficient use of the bandwidth needed to transmit the content items, since larger content items are penalized in favor of smaller content items. Alternatively or additionally, other factors may be considered when ranking the content items, such as a measure of quality relating to the content items, a measure of visibility relating to the content items, the duration until cache expiration of the content items, etc.

Although FIG. 7 shows example components 700, in other implementations, fewer, different, differently arranged, or additional components than depicted in FIG. 7 may be implemented. Additionally, or alternatively, one or more components 700 may perform one or more of the tasks described as being performed by one or more other components 700.

Referring back to FIG. 5, cache pre-population server 220 may fetch and store the determined content (e.g., the content items in content items list 720) (block 530). The determined content may be fetched from servers 210/215 using, for example, a crawler program or another program. For each content item, the content item as well as the HTTP header information associated with the content item may be fetched from servers 210/215 and stored. The HTTP header information, associated with cacheability of the content item (e.g., the cache expiration date), may be particularly fetched and stored. In one implementation, cache pre-population server 220 may additionally include information about the copyright and redistribution laws that apply to each content item.

Figure 8:
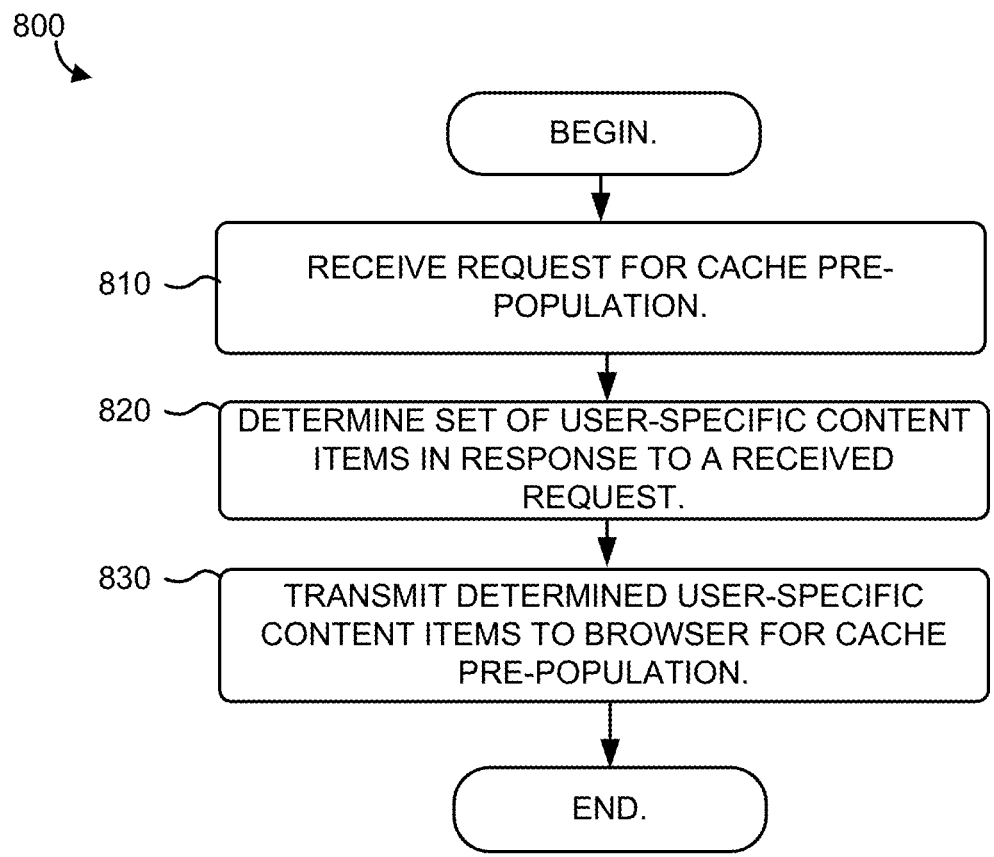
FIG. 8 is a flowchart of an example process for pre-populating the cache of a browser.

FIG. 8 is a flowchart of an example process 800 for pre-populating a browser's cache. In one implementation, process 500 may be performed by one or more components of cache pre-population server 220. The components shown in FIG. 8 may be implemented by software and/or hardware of cache pre-population server 220.

Process 800 may include receiving a request for cache pre-population (block 810). The request may include one or more user-specific signals. Alternatively, the user-specific signals may be looked-up based on a user or client associated with the request. The request may be associated with a number of different situations. For example, browser 207, after initial installation, may contact cache pre-population server 220 to request an initial cache pre-population. Alternatively or additionally, the pre-population request may be associated with a user downloading an installation file for browser 207. In this situation, the content items associated with the pre-population request may be downloaded as part of the installation files. As yet another example, an installed browser 207 may occasionally transmit browser pre-population requests, such as by automatically transmitting a request or in response to an explicit user instruction. In this situation, the "pre-population" requests may be used to supplement an existing browser cache.

Process 800 may further include determining a set of user-specific content items in response to the received request (block 820). The determined content items may be content items that are likely to be requested by the user via browser 207. For example, the content items may include a certain quantity of content items from content items list 720 that are likely to be requested by the user, as determined by an analysis of the user-specific signals received with or obtained from the request in block 810. In situations in which no user-specific signals were received with the request, the determined content items may include a certain total quantity or total size of content items that correspond to the most frequently accessed content items as were previously accessed by all of the users represented in access pattern logs 620.

In situations in which user-specific signals are available, a number of techniques may be used to determine the content items in block 820. For example, a machine learning model (e.g., a logistic regression model) may be trained to learn access rate for various web content items based on the user-specific signals. The model may then be used to predict the access rate for the website content items for the particular user. Alternatively, a user segmentation technique may be used, in which users are classified into categories and a set of content items are stored for each possible category. In this situation, the user-specific signals may be used to assign the user to a category. The content items that were previously assigned to that category may then be determined, in block 820, for the user associated with the request.

Figure 9:
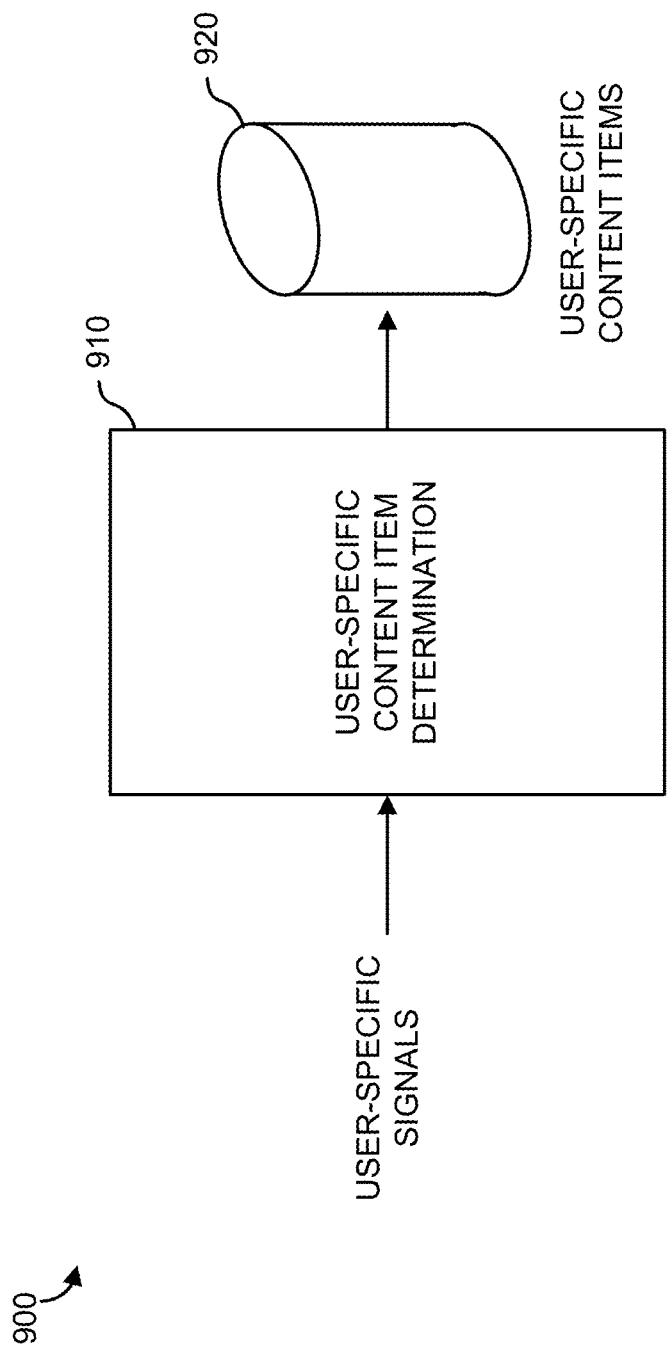
FIG. 9 is diagram conceptually illustrating components for one example implementation for determining user-specific content items in response to a received request to pre-populate a browser cache.

FIG. 9 is diagram conceptually illustrating functional components 900 for one example implementation for determining user-specific content items in response to the received request, as performed in block 820. The components shown in FIG. 9 may be implemented by software and/or hardware of cache pre-population server 220.

Components 900 may include user-specific content item determination component 910 and user-specific content items 920. User-specific content item determination component 910 may receive the user-specific signals associated with the request and generate user-specific content items 920.

User-specific content item determination component 910 may use machine learning models to generate user-specific content items 920. For example, content item determination component 910 may use a logistic regression technique or another machine learning technique to learn the access rates for combinations of user-specific signals. As one example of such a technique, maximum likelihood may be used to determine, for each content item, a base rate and a set of rate multipliers associated with each discrete value of the user-specific signals (e.g., gender, a location zip code, age range, OS type values, etc.). For example, for a particular content item, a base rate might be $10^{-8}$ accesses per second and the multipliers may be 2.04 for country equal to US, 0.32 for country equal to India, 1.07 for OS equal to Windows, etc. For this example, the total "score" for this particular content item for a user that is in the US and is using the Windows OS would be equal to $10^{-8} \times 2.04 \times 1.07$. In this situation, a set of the highest scoring content items from content item list 720, for the user, may be determined by content item determination component 910 to generate user-specific content items 920.

As another example of a technique to learn the access rates for combinations of user-specific signals, content item determination component 910 may use a segmentation technique in which combinations of the user-specific signals correspond to categories (e.g., "Windows OS users in NY City," "males aged 30-35 on the US West Coast," etc.). In this implementation, content item determination component 910 may determine the category of the user based on the user-specific signals. Each possible user category may be associated with a set of the highest scoring content items for the users in the category.

Although FIG. 9 shows example components 900, in other implementations, fewer, different, differently arranged, or additional components than depicted in FIG. 9 may be implemented. Additionally, or alternatively, one or more components 900 may perform one or more of the tasks described as being performed by one or more other components 900.

Referring back to FIG. 8, the set of user-specific content items may be transmitted to browser 207 (block 830). The set of user-specific content items may be used to pre-populate or supplement the cache of browser 207. Depending on the form of the request for pre-population, the content items may be transmitted to browser 207 in a number of different ways. For example, the set of user-specific content items may have been determined as part of the user downloading and installing of browser 207, immediately after installation, in the background the first time the user starts browser 207, or at some other time. If the set of user-specific content items is determined as part of the user downloading and installing of browser 207, the set of user-specific content items may be downloaded, for example, with the main installation file. The set of user-specific content items may also be downloaded as a separate file, as a series of files, by a separate intermediate server, etc. The file that contains the set of user-specific content items may be transmitted as a single large file or transmitted as a "trickle" (i.e., in the background with a low bandwidth connection) to the user in which content items are sent in priority order. In one implementation, the user of browser 207, or browser 207 itself, may decide how much bandwidth to devote to downloading the set of user-specific content items. Alternatively, the set of user-specific content items can be written to physical media (e.g., Blueray disc, hard disks, USB sticks, flash drives, etc.) and directly shipped to the user.

In one implementation, the set of user-specific content items shipped to the user may be transmitted to browser 207 in a format identical to how the content items would be stored by browser 207. For example, the content items may be compressed and include the HTTP headers associated with the content items. Browser 207, or another component at client 205, may store the content items in the browser's cache, such as cache 420, potentially depending on available local disk space. If the cache has already reached its maximum capacity, downloading of the set of user-specific content items may be stopped or other actions may be taken (e.g., older content items may be deleted from the cache).

As described above, based on access pattern logs 620, content items were described as being determined, fetched, and stored by cache pre-population server 220. In an alternative possible implementation, instead of storing the content items, cache pre-population server 220 may send a list of the content items (e.g., a list of URLs) to browsers 207. Browsers 207 may then directly fetch the content items from servers 210/215. Browsers 207 may, for example fetch the content items in a way that does not degrade the experience of the user (e.g., in the background when client 205 is not busy).

CONCLUSION

An implementation, described above, may pre-populate or supplement a browser's cache with content items that are selected based on user-specific information. Pre-populating the browser's cache may increase the performance of the browser and improve the user's browsing experience.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 8, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor—creating a specific purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, comprising:
   receiving, by the device, access pattern information relating to web content items that are likely to be relevant to a plurality of users;
   receiving, by the device, particular user-specific information of a particular user of the plurality of users;
   receiving, by the device and from a client device of the particular user, a request for pre-population of a cache of a browser of the client device independent of any user using the browser for any web browsing activity;
   identifying, by the device, the particular user-specific information based on the request;
   determining, by the device, access rates for the web content items based on the access pattern information;
   calculating, by the device, scores of the web content items based on the access rates and sizes of the web content items;
   determining, by the device and based on the particular user-specific information and the scores of the web content items, one or more of the web content items that are associated with websites that the particular user is likely to visit; and
   transmitting, by the device, the one or more of the web content items to the client device for the client device to pre-populate the cache of the browser with the one or more of the web content items.

2. The method of claim 1, where the access pattern information includes information identifying visited web pages that is received from browser toolbars.

3. The method of claim 1, further comprising:
fetching the one or more of the web content items; and
storing hyper-text transfer protocol (HTTP) headers associated with the one or more of the web content items.

4. The method of claim 1, where the particular user-specific information includes information relating to a geographic location of the particular user, demographic information of the particular user, or a type of operating system being used by the particular user.

5. The method of claim 1, where determining the one or more of the web content items includes:
determining a likelihood that the web content items will be requested by the particular user based on the particular user-specific information and the scores of the web content items; and
identifying the one or more of the web content items based on the determined likelihood.

6. The method of claim 1, where determining the one or more of the web content items includes:
training a machine learning model based on the scores of the web content items; and
using the machine learning model to determine the one or more of the web content items based on the particular user-specific information.

7. The method of claim 1, where determining the one or more of the web content items further includes:
determining the one or more of the web content items further based on a segmentation technique in which the web content items are categorized into categories corresponding to discrete values of the particular user-specific information and in which the one or more of the web content items correspond to web content items in a category of the particular user.

8. The method of claim 1, where transmitting the one or more of the web content items includes:
transmitting uniform resource locators (URLs), of the one or more of the web content items, to the browser of the client device.

9. A non-transitory computer-readable medium containing instructions executable by at least one processor of a server, the instructions comprising:
one or more instructions to receive access pattern information relating to a plurality of web content items that are likely to be relevant to a plurality of users;
one or more instructions to receive particular user-specific information of a particular user of the plurality of users;
one or more instructions to receive, from a client device of the particular user, a request for content items to use in pre-population of a cache of a browser of the client device independent of any user using the browser for any web browsing activity;
one or more instructions to identify the particular user-specific information based on the request;
one or more instructions to determine access rates for the web content items based on the access pattern information;
one or more instructions to calculate scores of the web content items based on the access rates and sizes of the web content items;
one or more instructions to determine, based on the particular user-specific information and the scores of the web content items, one or more of the web content items that are associated with websites that the particular user is likely to visit; and
one or more instructions to transmit the one or more of the web content items to the client device to pre-populate the cache of the browser with the one or more of the web content items.

10. The non-transitory computer-readable medium of claim 9, further comprising:
one or more instructions to fetch and store hyper-text transfer protocol (HTTP) headers associated with the one or more of the web content items.

11. The non-transitory computer-readable medium of claim 9, where the particular user-specific information includes information relating to a geographic location of the particular user, demographic information of the particular user, or a type of operating system being used by the particular user.

12. A server device comprising:
a memory; and
one or more processors to:
identify historical access pattern information associated with a plurality of web content items that are likely to be relevant to a plurality of users;
determine access rates for the plurality of web content items based on the historical access pattern information;
calculate scores of the plurality of web content items based on the access rates and sizes of the plurality of web content items;
receive, from a client device, a request to pre-populate a cache of a browser program of the client device independent of any user using the browser program for any web browsing activity;
identify, based on the scores of the plurality of web content items and the request, a set of web content items that are likely to be accessed by a particular user of the client device,
the set of web content items being a subset of the plurality of web content items, and
the plurality of users including the particular user; and
transmit the set of web content items to the client device to pre-populate the cache of the browser program.

13. The server device of claim 12, where the one or more processors are further to:
determine the plurality of web content items as a list of web content items that have been accessed by two or more of the plurality of users.

14. The server device of claim 12, where the historical access pattern information includes information regarding visited web pages that is based on selection information generated as part of website search logs.

15. The server device of claim 12, where the one or more processors are further to:
store hyper-text transfer protocol (HTTP) headers associated with the plurality of web content items.

16. The server device of claim 12, where, when identifying the set of web content items, the one or more processors are further to:
identify the set of web content items that are likely to be accessed by the particular user further based on particular user-specific information of the particular user.

17. The server device of claim 16, where the particular user-specific information includes information relating to a geographic location, demographic information, or a type of operating system of the particular user.

18. A non-transitory computer-readable medium containing instructions executable by at least one processor of a server, the instructions comprising:

one or more instructions to identify historical access pattern information associated with a plurality of web content items that are likely to be relevant to a plurality of users;

one or more instructions to determine access rates for the plurality of web content items based on the historical access pattern information;

one or more instructions to calculate scores of the plurality of web content items based on the access rates and sizes of the plurality of web content items;

one or more instructions to receive, from a client device, a request to pre-populate a cache of a browser program of the client device independent of any user using the browser program for any web browsing activity;

one or more instructions to determine, based on the scores of the plurality of web content items and based on the request, a set of web content items that are likely to be accessed by a particular user of the plurality of users, the set of web content items being a subset of the plurality of web content items; and one or more instructions to transmit the set of web content items to the client device for the client device to pre-populate the cache of the browser program.

19. The non-transitory computer-readable medium of claim 18, where the request is received from the browser program when the client device is downloading an installation file for the browser program.

20. The non-transitory computer-readable medium of claim 18, where the historical access pattern information includes information that is based on link selection information that is generated as part of website search logs.

21. The non-transitory computer-readable medium of claim 18, where the one or more instructions to calculate the scores of the plurality of web content items comprise:

one or more instructions to divide the access rates by values associated with the sizes of the plurality of web content items.

22. A method comprising:

receiving, by one or more server devices, access pattern information relating to web content items that are likely to be relevant to a plurality of users;

determining, by the one or more server devices, access rates for the web content items based on the access pattern information;

calculating, by the or more server devices, scores of the web content items based on the access rates and sizes of the web content items;

determining, by the one or more server devices, a list of the web content items based on the scores of the web content items;

determining, by the one or more server devices, one or more web content items, from the list of the web content items, that a particular user, of the plurality of users, is likely to visit, the one or more web content items being determined independent of any user using a browser, of a client device of the particular user, for any web browsing activity; and transmitting, by the one or more server devices, the determined one or more web content items to the client device for the client device to pre-populate a cache, of the browser of the client device, with the determined one or more web content items.

23. The method of claim 22, where determining the one or more web content items includes:

determining particular user-specific information of the particular user; and determining the one or more web content items based on the list of the web content items and the particular user-specific information.

24. The method of claim 22, further comprising:

receiving, from the client device, a request to pre-populate the cache of the browser of the client device independent of any user using the browser for any web browsing activity, determining the one or more web content items including:

determining the one or more web content items based on the list of the web content items and the request.

25. The method of claim 22, where transmitting the determined one or more web content items further includes:

transmitting, to the client device, hyper-text transfer protocol (HTTP) header information associated with the determined one or more web content items.

26. The method of claim 22, where determining the access rates comprises:

determining a quantity of instances associated with a particular web content item, of the one or more web content items, based on the access pattern information, and determining a particular access rate, of the access rates, by dividing the quantity of instances by a particular time period associated with the access pattern information.

* * * * *